United States Patent
Liu et al.

(10) Patent No.: US 10,621,155 B2
(45) Date of Patent: Apr. 14, 2020

(54) METHOD AND APPARATUS FOR DATA INTEGRATION

(71) Applicant: Huawei Technologies Co., Ltd., Shenzhen (CN)

(72) Inventors: Shikai Liu, Nanjing (CN); Jie Feng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 752 days.

(21) Appl. No.: 15/370,654

(22) Filed: Dec. 6, 2016

(65) Prior Publication Data

US 2017/0083555 A1    Mar. 23, 2017

Related U.S. Application Data

(63) Continuation of application No. PCT/CN2014/079378, filed on Jun. 6, 2014.

(51) Int. Cl.
*G06F 16/20* (2019.01)
*G06F 16/22* (2019.01)
(Continued)

(52) U.S. Cl.
CPC ........ *G06F 16/2272* (2019.01); *G06F 16/215* (2019.01); *G06F 16/254* (2019.01)

(58) Field of Classification Search
CPC .... G06F 16/22; G06F 16/2272; G06F 16/215; G06F 16/254
See application file for complete search history.

(56) References Cited

U.S. PATENT DOCUMENTS 5,953,707 A  *  9/1999  Huang ............... G06Q 10/06
                                                          705/7.25
2003/0037251 A1 *  2/2003  Frieder .............. G06F 21/552
                                                           726/23
(Continued)

FOREIGN PATENT DOCUMENTS

CN         1801197 A       7/2006
CN       101908040 A      12/2010

OTHER PUBLICATIONS

Rahm, E., et al., "A Survery of approaches to automatic schema matching," XP058152794, The VLDB Journal 10, Digital Object Identifier (DOI), Feb. 5, 2001, pp. 334-350.
(Continued)

*Primary Examiner* — Alford W Kindred
*Assistant Examiner* — Tiffany Thuy Bui
(74) *Attorney, Agent, or Firm* — Conley Rose, P.C.

(57) ABSTRACT

A data integration method and apparatus, where the method includes sampling a first data source (A) at least twice to obtain a first sample data source (a) and a second sample data source (a'), separately calculating an index of each attribute field of the A, a second data source (B), the a, and the a', determining a decision value of an attribute field $X_i$ of the A according to a difference degree between an index of an attribute field $X_i$ of the a and an index of each attribute field $X_j$ of the a', and mapping, to the attribute field $X_i$ of the first data source, an attribute field that is of the B and whose index and the attribute field $X_i$ of the A have a difference degree less than the decision value.

20 Claims, 3 Drawing Sheets

(51) Int. Cl.
*G06F 16/215* (2019.01)
*G06F 16/25* (2019.01)

(56) References Cited

U.S. PATENT DOCUMENTS

| | | | |
|---|---|---|---|
| 2005/0005186 A1* | 1/2005 | Goebel | G06Q 10/06 714/1 |
| 2007/0244913 A1 | 10/2007 | Hayhow et al. | |
| 2010/0023961 A1* | 1/2010 | Kim | G06K 9/00751 725/22 |
| 2011/0191373 A1* | 8/2011 | Botros | G06F 16/9038 707/776 |
| 2012/0259865 A1 | 10/2012 | Lakshmanan et al. | |
| 2014/0297706 A1* | 10/2014 | Kishi | H04N 19/60 708/300 |
| 2015/0019600 A1* | 1/2015 | Kanehira | G06F 16/183 707/827 |
| 2016/0035230 A1* | 2/2016 | Spaulding | G09B 5/02 434/236 |

OTHER PUBLICATIONS

Foreign Communication From a Counterpart Application, European Application No. 14893959.8, Extended European Search Report dated May 4, 2017, 12 pages.

Foreign Communication From a Counterpart Application, PCT Application No. PCT/CN2014/079378, English Translation of International Search Report dated Mar. 6, 2015, 2 pages.

Foreign Communication From a Counterpart Application, PCT Application No. PCT/CN2014/079378, English Translation of Written Opinion dated Mar. 6, 2015, 7 pages.

* cited by examiner

METHOD AND APPARATUS FOR DATA INTEGRATION

CROSS-REFERENCE TO RELATED APPLICATIONS

This application is a continuation of International Application No. PCT/CN2014/079378, filed on Jun. 6, 2014, the disclosure of which is hereby incorporated by reference in its entirety.

TECHNICAL FIELD

This application relates to the data processing field, and in particular, to a method and apparatus for data integration.

BACKGROUND

In production and life, a situation in which two different data sources need to be integrated occurs frequently. For example, an operator sometimes needs to integrate data in a client relationship management system and data in a billing system. However, because there are tens of millions of clients, tens of millions of records need to be created in the client relationship management system and the billing system, where each record further includes multiple attribute fields (there may be thousands of attribute fields in a large system) such as age and income, and different attribute names may be used in different systems for a same attribute. Therefore, data integration becomes extremely time-consuming and inefficient work.

SUMMARY

This application provides a data integration method and apparatus, which can automatically implement mapping between same attribute fields and improve working efficiency.

A first aspect of this application provides a data integration apparatus, including a sampling module, a statistics module, a first obtaining module, a determining module, a second obtaining module, and a mapping module, where the sampling module is configured to sample a first data source A at least twice to obtain a first sample data source a and a second sample data source a', and send the first sample data source a and the second sample data source a' to the statistics module. The statistics module is configured to separately calculate an index of each attribute field $X_1, X_2, \ldots,$ and $X_n$ of the first data source A, an index of each attribute field $X_1, X_2, \ldots,$ and $X_n$ of the first sample data source a, an index of each attribute field $X_1, X_2, \ldots,$ and $X_n$ of the second sample data source a', and an index of each attribute field $Y_1, Y_2, \ldots,$ and $Y_m$ of a second data source B, and send the indexes calculated to the first obtaining module and the second obtaining module, where n is a quantity of attribute fields of the first data source A, the first sample data source a, and the second sample data source a', m is a quantity of attribute fields of the second data source B, and the index is used to represent a data feature of the attribute field. The first obtaining module is configured to obtain a difference degree between an index of an attribute field $X_i$ of the first sample data source a and an index of a same attribute field $X_i$ of the second sample data source a', and difference degrees between the index of the attribute field $X_i$ of the first sample data source a and indexes of different attribute fields of the second sample data source a', and send the obtained difference degrees to the determining module, where i is a free variable, i=1, 2, 3, ..., n, and the different attribute fields are all attribute fields except $X_i$ in the attribute fields of the second sample data source a'. The determining module is configured to determine a decision value of an attribute field $X_i$ of the first data source A according to the difference degree between the index of the attribute field $X_i$ of the first sample data source a and the index of the same attribute field $X_i$ of the second sample data source a' and the difference degrees between the index of the attribute field $X_i$ of the first sample data source a and the indexes of the different attribute fields of the second sample data source a', and send the decision value of the attribute field $X_i$ of the first data source A to the mapping module, where the decision value is a difference degree threshold used to determine whether an attribute field and the attribute field $X_i$ of the first data source A represent a same attribute. The second obtaining module is configured to obtain difference degrees between an index of the attribute field $X_i$ of the first data source A and the indexes of all the attribute fields $Y_1, Y_2, \ldots,$ and $Y_m$ of the second data source B, and send the obtained difference degrees to the mapping module, and the mapping module is configured to map, to the attribute field $X_i$ of the first data source A, an attribute field that is of the second data source B and whose index and the index of the attribute field $X_i$ of the first data source A have a difference degree less than the decision value.

With reference to the first aspect, a first possible implementation manner of the first aspect of this application, the index includes at least one of a standard deviation, a variance, a skewness, a standard deviation of skewness, a kurtosis, a standard deviation of kurtosis, a standard error of mean, an outlier, or an extremum.

With reference to the first aspect or the first possible implementation manner, a second possible implementation manner of the first aspect of this application, the difference degree includes a difference value between indexes, a ratio between indexes, or an error ratio between indexes.

With reference to the first aspect or the first or the second possible implementation manner, a third possible implementation manner of the first aspect of this application, the determining module is configured to use the difference degree between the index of the attribute field $X_i$ of the first sample data source a and the index of the same attribute field $X_i$ of the second sample data source a' as a sample of a same attribute, use the difference degrees between the index of the attribute field $X_i$ of the first sample data source a and the indexes of the different attribute fields of the second sample data source a as samples of different attributes, and perform classified modeling on the sample of a' same attribute and the samples of different attributes using a decision tree algorithm to obtain the decision value of the attribute field $X_i$ of the first data source A.

With reference to the first aspect or any one of the first to the third possible implementation manners, a fourth possible implementation manner of the first aspect of this application, an output module is further included, where the output module is configured to output the attribute fields that are of the second data source B and whose indexes and the index of the attribute field $X_i$ of the first data source A have difference degrees less than the decision value for a user to select when a quantity of attribute fields that are of the second data source B and whose indexes and the index of the attribute field $X_i$ of the first data source A have difference degrees less than the decision value is greater than or equal to 2.

A second aspect of this application provides a data integration apparatus, including a processor, an input interface, and an output interface, where the input interface is configured to provide a first data source A and a second data source B for the processor. The processor is configured to sample the first data source A at least twice to obtain a first sample data source a and a second sample data source a', separately calculate an index of each attribute field $X_1, X_2, \ldots,$ and $X_n$ of the first data source A, an index of each attribute field $X_1, X_2, \ldots,$ and $X_n$ of the first sample data source a, an index of each attribute field $X_1, X_2, \ldots,$ and $X_n$ of the second sample data source a', and an index of each attribute field $Y_1, Y_2, \ldots,$ and $Y_m$ of the second data source B, where n is a quantity of attribute fields of the first data source A, the first sample data source a, and the second sample data source a', m is a quantity of attribute fields of the second data source B, and the index is used to represent a data feature of the attribute field, obtain a difference degree between an index of an attribute field $X_i$ of the first sample data source a and an index of a same attribute field $X_i$ of the second sample data source a', and difference degrees between the index of the attribute field $X_i$ of the first sample data source a and indexes of different attribute fields of the second sample data source a', where i is a free variable, i=1, 2, 3, ..., n, and the different attribute fields are all attribute fields except $X_i$ in the attribute fields of the second sample data source a', determine a decision value of an attribute field $X_i$ of the first data source A according to the difference degree between the index of the attribute field $X_i$ of the first sample data source a and the index of the same attribute field $X_i$ of the second sample data source a' and the difference degrees between the index of the attribute field $X_i$ of the first sample data source a and the indexes of the different attribute fields of the second sample data source a', where the decision value is a difference degree threshold used to determine whether an attribute field and the attribute field $X_i$ of the first data source A represent a same attribute, obtain difference degrees between an index of the attribute field $X_i$ of the first data source A and the indexes of all the attribute fields $Y_1, Y_2, \ldots,$ and $Y_m$ of the second data source B, and map, to the attribute field $X_1$ of the first data source A, an attribute field that is of the second data source B and whose index and the index of the attribute field $X_i$ of the first data source A have a difference degree less than the decision value, and the output interface is configured to output the first data source A obtained after mapping.

With reference to the second aspect, a first possible implementation manner of the second aspect of this application, the index includes at least one of a standard deviation, a variance, a skewness, a standard deviation of skewness, a kurtosis, a standard deviation of kurtosis, a standard error of mean, an outlier, or an extremum.

With reference to the second aspect or the first possible implementation manner, a second possible implementation manner of the second aspect of this application, the difference degree includes a difference value between indexes, a ratio between indexes, or an error ratio between indexes.

With reference to the second aspect or the first or the second possible implementation manner, a third possible implementation manner of the second aspect of this application, the processor is configured to determine a decision value of an attribute field $X_i$ of the first data source A according to the difference degree between the index of the attribute field $X_i$ of the first sample data source a and the index of the same attribute field $X_i$ of the second sample data source a' and the difference degrees between the index of the attribute field $X_i$ of the first sample data source a and the indexes of the different attribute fields of the second sample data source a', the processor is further configured to use the difference degree between the index of the attribute field $X_i$ of the first sample data source a and the index of the same attribute field $X_i$ of the second sample data source a' as a sample of a same attribute, use the difference degrees between the index of the attribute field $X_i$ of the first sample data source a and the indexes of the different attribute fields of the second sample data source a' as samples of different attributes, and perform classified modeling on the sample of a same attribute and the samples of different attributes using a decision tree algorithm to obtain the decision value of the attribute field $X_i$ of the first data source A.

With reference to the second aspect or any one of the first to the third possible implementation manners, a fourth possible implementation manner of the second aspect of this application, the processor is further configured to output, using the output interface, the attribute fields that are of the second data source B and whose indexes and the index of the attribute field $X_i$ of the first data source A have difference degrees less than the decision value for a user to select when a quantity of attribute fields that are of the second data source B and whose indexes and the index of the attribute field $X_i$ of the first data source A have difference degrees less than the decision value is greater than or equal to 2.

A third aspect of this application provides a data integration method, including sampling a first data source A at least twice to obtain a first sample data source a and a second sample data source a', separately calculating an index of each attribute field $X_1, X_2, \ldots,$ and $X_n$ of the first data source A, an index of each attribute field $X_1, X_2, \ldots,$ and $X_n$ of the first sample data source a, an index of each attribute field $X_1, X_2, \ldots,$ and $X_n$ of the second sample data source a', and an index of each attribute field $Y_1, Y_2, \ldots,$ and $Y_m$ of a second data source B, where n is a quantity of attribute fields of the first data source A, the first sample data source a, and the second sample data source a', m is a quantity of attribute fields of the second data source B, and the index is used to represent a data feature of the attribute field, obtaining a difference degree between an index of an attribute field $X_i$ of the first sample data source a and an index of a same attribute field $X_i$ of the second sample data source a', and difference degrees between the index of the attribute field $X_i$ of the first sample data source a and indexes of different attribute fields of the second sample data source a', where i is a free variable, i=1, 2, 3, ... n, and the different attribute fields are all attribute fields except $X_i$ in the attribute fields of the second sample data source a', determining a decision value of an attribute field $X_i$ of the first data source A according to the difference degree between the index of the attribute field $X_i$ of the first sample data source a and the index of the same attribute field $X_i$ of the second sample data source a' and the difference degrees between the index of the attribute field $X_i$ of the first sample data source a and the indexes of the different attribute fields of the second sample data source a', where the decision value is a difference degree threshold used to determine whether an attribute field and the attribute field $X_i$ of the first data source A represent a same attribute, obtaining difference degrees between an index of the attribute field $X_i$ of the first data source A and the indexes of all the attribute fields $Y_1, Y_2, \ldots,$ and $Y_m$ of the second data source B, and mapping, to the attribute field $X_i$ of the first data source A, an attribute field that is of the second data source B and whose index and the index of the attribute field $X_i$ of the first data source A have a difference degree less than the decision value.

With reference to the third aspect, a first possible implementation manner of the third aspect of this application, the index includes at least one of a standard deviation, a variance, a skewness, a standard deviation of skewness, a kurtosis, a standard deviation of kurtosis, a standard error of mean, an outlier, or an extremum.

With reference to the third aspect or the first possible implementation manner, a second possible implementation manner of the third aspect of this application is the difference degree includes a difference value between indexes, a ratio between indexes, or an error ratio between indexes.

With reference to the third aspect or the first or the second possible implementation manner, a third possible implementation manner of the third aspect of this application, determining a decision value of an attribute field $X_i$ of the first data source A according to the difference degree between the index of the attribute field $X_i$ of the first sample data source a and the index of the same attribute field $X_i$ of the second sample data source a' and the difference degrees between the index of the attribute field $X_i$ of the first sample data source a and the indexes of the different attribute fields of the second sample data source a' includes using the difference degree between the index of the attribute field $X_i$ of the first sample data source a and the index of the same attribute field $X_i$ of the second sample data source a' as a sample of a same attribute, using the difference degrees between the index of the attribute field $X_i$ of the first sample data source a and the indexes of the different attribute fields of the second sample data source a' as samples of different attributes, and performing classified modeling on the sample of a same attribute and the samples of different attributes using a decision tree algorithm to obtain the decision value of the attribute field $X_i$ of the first data source A.

With reference to the third aspect or any one of the first to the third possible implementation manners, a fourth possible implementation manner of the third aspect of this application, the attribute fields that are of the second data source B and whose indexes and the index of the attribute field $X_i$ of the first data source A have difference degrees less than the decision value are output for a user to select if a quantity of attribute fields that are of the second data source B and whose indexes and the index of the attribute field $X_i$ of the first data source A have difference degrees less than the decision value is greater than or equal to 2.

In the foregoing solution, when data of a second data source needs to be mapped to a first data source, sampling is performed at least twice on the first data source to obtain a first sample data source and a second sample data source. Then statistics about an index of each attribute field of the two sample data sources are collected, subtraction is performed on an index of an attribute field of the first sample data source and indexes of all attribute fields of the second sample data source to obtain a difference degree between an attribute field of the first sample data source and each attribute field of the second sample data source. Then a decision value of the attribute field of the first data source is determined according to a difference degree between the index of the attribute field of the first sample data source and an index of a same attribute field of the second sample data source and difference degrees between the index of the attribute field of the first sample data source and indexes of different attribute fields of the second sample data source. Then an attribute field that is of the second data source and whose index and the index of the attribute field of the first data source have a difference degree less than the decision value is mapped to the attribute field of the first data source. Because in this solution, automatic mapping of an attribute field of a data source to a same attribute field of another data source can be implemented, it is more convenient than data integration that is manually implemented, and efficiency is significantly improved.

DESCRIPTION OF EMBODIMENTS

In the following description, to illustrate rather than limit, specific details such as a particular system structure, an interface, and a technology are provided to offer a thorough understanding of this application. However, persons skilled in the art should know that this application may be practiced in other implementation manners without these specific details. In other cases, detailed descriptions of well-known apparatuses, circuits, and methods are omitted such that this application is described without being obscured by unnecessary details.

Figure 1:
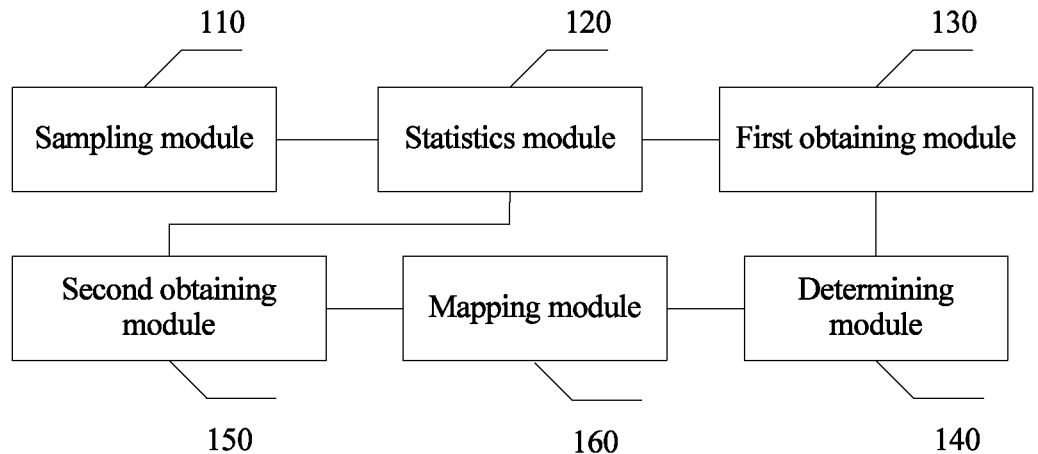
FIG. 1 is a schematic structural diagram of a data integration apparatus according to an embodiment of this application.

Referring to FIG. 1, FIG. 1 is a schematic structural diagram of a data integration apparatus according to an embodiment of this application. In this embodiment, the data integration apparatus includes a sampling module 110, a statistics module 120, a first obtaining module 130, a determining module 140, a second obtaining module 150, and a mapping module 160.

The sampling module 110 is configured to sample a first data source A at least twice to obtain a first sample data source a and a second sample data source a', and send the first sample data source a and the second sample data source a' to the statistics module 120.

In this application, the data integration apparatus is configured to integrate data, of a same attribute, in the first data source A and a second data source B, where the first data source A and the second data source B may be databases or files. In this embodiment, the data integration apparatus directly performs data integration on data sources that are in a file form, and the data integration apparatus first exports data of the databases into files and then performs data integration when the data sources are databases. It should be noted that, the first data source A and the second data source B in this application are not limited to databases or files, and in another embodiment, the data source in this application may be a data source of another type, such as a web data source. The data integration apparatus is not limited to directly performing data integration on file data sources either, but may also directly perform data integration on database data sources. Therefore, a type of the data source in this application is not limited herein.

In this embodiment, there are multiple records in both the first data source A and the second data source B, and each record has multiple attribute fields. For example, both the first data source A and the second data source B that are used to record information about different clients have attribute fields such as a phone number and an age, and phone numbers and ages of the different clients are correspondingly recorded in the information about the clients. In practical application, for example, in a service system of a telecommunications operator, there may be hundreds of thousands of or even more than ten million records included in the first data source and the second data source, and each record may include more than one thousand attribute fields. It may be understood that attribute fields of the data source are mutually different to distinguish different attributes.

The sampling module 110 samples the first data source A at least twice. In this embodiment, preferably, random sampling is performed twice, data obtained at the first time of sampling is the first sample data source a, and data obtained at the second time of sampling is the second sample data source a'. Considering accuracy of a subsequent decision and a calculation amount of the data integration apparatus, a sampling scale is generally 10% to 30% of a total quantity of records in the data source each time, and is preferably 20%. For example, the first data source A has totally 10 million records, and 2 million records are randomly extracted from the first data source A each time, to separately obtain the first sample data source a and the second sample data source a'.

The statistics module 120 is configured to separately calculate an index of each attribute field $X_1, X_2, \ldots,$ and $X_n$ of the first data source A, an index of each attribute field $X_1, X_2, \ldots,$ and $X_n$ of the first sample data source a, an index of each attribute field $X_1, X_2, \ldots,$ and $X_n$ of the second sample data source a', and an index of each attribute field $Y_1, Y_2, \ldots,$ and $Y_m$ of the second data source B, and send the indexes calculated to the first obtaining module 130 and the second obtaining module 150, where n is a quantity of attribute fields of the first data source A, the first sample data source a, and the second sample data source a', m is a quantity of attribute fields of the second data source B, and the index is used to represent a data feature of the attribute field. For example, the index includes at least one of a standard deviation, a variance, a skewness, a standard deviation of skewness, a kurtosis, a standard deviation of kurtosis, a standard error of mean, an outlier, or an extremum of data in the attribute field.

Sending the indexes calculated to the first obtaining module 130 and the second obtaining module 150 includes sending the index of each attribute field $X_1, X_2, \ldots,$ and $X_n$ of the first sample data source a and the index of each attribute field $X_1, X_2, \ldots,$ and $X_n$ of the second sample data source a' that are calculated to the first obtaining module 130, and sending the indexes of all the attribute fields $X_1, X_2, \ldots,$ and $X_n$ of the first data source A and the index of each attribute field $Y_1, Y_2, \ldots,$ and $Y_m$ of the second data source B that are calculated to the second obtaining module 150.

It should be noted that, although the attribute fields included in the first data source A, the first sample data source a, and the second sample data source a' are the same, the indexes of the attribute fields are calculated based on different data ranges. The indexes of the attribute fields of the first data source A are calculated based on data records included in the first data source A, the indexes of the attribute fields of the first sample data source a are calculated based on data records included in the first sample data source a, and the indexes of the attribute fields of the second sample data source a' are calculated based on data records included in the second sample data source a'.

The statistics module 120 separately calculate the index of each field of the first data source A, the second data source B, and the first sample data source a and the second sample data source a' that are sampled by the sampling module 110 from the first data source A. For example, the first data source A includes 10 million records, the second data source B includes 8 million records, and the first sample data source a and the second sample data source a' each include 2 million records. The statistics module 120 calculates a feature of specific data of an attribute field $X_1$ in the 10 million records of the first data source A, and uses the feature as an index of the attribute field $X_1$ of the first data source A, where the feature is at least one of a standard deviation, a variance, a skewness, a standard deviation of skewness, a kurtosis, a standard deviation of kurtosis, a standard error of mean, an outlier, or an extremum. By analogy, the statistics module 120 calculates indexes of all the remaining attribute fields $X_2, \ldots,$ and $X_n$ of the first data source A according to the 10 million records of the first data source A. Similarly, the statistics module 120 calculates an index of each attribute field of the second data source B according to the 8 million records of the second data source B, calculates an index of each attribute field of the first sample data source a according to the 2 million records of the first sample data source a, and calculates an index of each attribute field of the second sample data source a' according to the 2 million records of the second sample data source a'.

It may be understood that same index types, that is, same data feature types, of the attribute fields need to be selected in this application. In addition, for ease of description, in this application, an attribute field of each of the first data source A, the first sample data source a, and the second sample data source a' is represented by $X_i$, where i is a free variable and i=1, 2, 3, . . . , n.

The first obtaining module 130 is configured to obtain a difference degree between an index of an attribute field $X_i$ of the first sample data source a and an index of a same attribute field $X_i$ of the second sample data source a', and difference degrees between the index of the attribute field $X_i$ of the first sample data source a and indexes of different attribute fields of the second sample data source a', and send the obtained difference degrees to the determining module 140, where the different attribute fields are all attribute fields except $X_i$ in the attribute fields of the second sample data source a'.

The difference degree is used to represent a size of a difference between compared indexes. In practical application, the difference degree may be represented by a difference value between the compared indexes, a ratio between the compared indexes, an error ratio between the compared indexes, or the like.

For example, it is assumed that the statistics module 120 calculates totally nine indexes including a standard deviation, a variance, a skewness, a standard deviation of skewness, a kurtosis, a standard deviation of kurtosis, a standard error of mean, an outlier, and an extremum, the first sample data source a and the second sample data source a' each include six attribute fields, and indexes of the six attribute fields of the first sample data source a and the six attribute fields of the second sample data source a' are shown in Table 1 and Table 2 (Table 1 shows the indexes of the attribute fields $X_1$-$X_6$ of the first sample data source a, and Table 2 shows the indexes of the attribute fields $X_1$-$X_6$ of the second sample data source a').

TABLE 1

|  | $X_1$ | $X_2$ | $X_3$ | $X_4$ | $X_5$ | $X_6$ |
|---|---|---|---|---|---|---|
| Standard deviation | 10387.465 | 0.442 | 25.483 | 25.874 | 1.315 | 0.941 |
| Variance | 107899439 | 0.195 | 649.403 | 669.482 | 1.729 | 0.885 |
| Skewness | −0.000537 | −1.0623 | 4.706 | 4.471 | −0.128 | 0.395 |
| Standard deviation of skewness | 0.0183 | 0.0183 | 0.0183 | 0.0183 | 0.0183 | 0.0183 |
| Kurtosis | −1.202 | −0.871 | 24.0974 | 21.786 | −1.156 | −1.0324 |
| Standard deviation of kurtosis | 0.0365 | 0.0365 | 0.0365 | 0.0365 | 0.0365 | 0.0365 |
| Standard error of mean | 77.424 | 0.00329 | 0.19 | 0.193 | 0.0098 | 0.00701 |
| Outlier | 0 | 0 | 229 | 241 | 0 | 0 |
| Extremum | 0 | 0 | 261 | 269 | 0 | 0 |

TABLE 2

|  | $X_1$ | $X_2$ | $X_3$ | $X_4$ | $X_5$ | $X_6$ |
|---|---|---|---|---|---|---|
| Standard deviation | 10395.568 | 0.44 | 24.921 | 25.647 | 1.315 | 0.943 |
| Variance | 108067832 | 0.193 | 621.0578 | 657.776 | 1.729 | 0.89 |
| Skewness | 0.000197 | −1.0825 | 4.761 | 4.498 | −0.119 | 0.4 |
| Standard deviation of skewness | 0.0183 | 0.0183 | 0.0183 | 0.0183 | 0.0183 | 0.0183 |
| Kurtosis | −1.2 | −0.828 | 24.877 | 22.188 | −1.16 | −1.028 |
| Standard deviation of kurtosis | 0.0365 | 0.0365 | 0.0365 | 0.0365 | 0.0365 | 0.0365 |
| Standard error of mean | 77.484 | 0.00328 | 0.186 | 0.191 | 0.0093 | 0.00703 |
| Outlier | 0 | 0 | 236 | 255 | 0 | 0 |
| Extremum | 0 | 0 | 270 | 251 | 0 | 0 |

The first obtaining module 130 performs subtraction between a standard deviation of the attribute field $X_1$ of the first sample data source a and a standard deviation of the attribute field $X_1$ of the second sample data source a' to obtain a difference degree between the standard deviation of the attribute field $X_1$ of the first sample data source a and the standard deviation of the attribute field $X_1$ of the second sample data source a'. By analogy, subtraction is performed between all indexes, that is, a variance, a skewness, a standard deviation of skewness, a kurtosis, a standard deviation of kurtosis, a standard error of mean, an outlier, and an extremum, of the attribute field $X_1$ of the first sample data source a and corresponding indexes of the attribute field $X_1$ of the second sample data source a'. Therefore, difference degrees between the nine indexes of the attribute field $X_1$ of the first sample data source a and the corresponding indexes of the attribute field $X_1$ of the second sample data source a' are obtained. For example, according to data in the foregoing tables, the difference degrees between the attribute field $X_1$ of the first sample data source a and the attribute field $X_1$ of the second sample data source a' in terms of a standard deviation, a variance, a skewness, a standard deviation of skewness, a kurtosis, a standard deviation of kurtosis, a standard error of mean, an outlier, and an extremum are sequentially 1.997, 168393, 0.000734, 0, 0.002, 0, 0.06, 0, and 0. Similarly, the first obtaining module 130 obtains difference degrees between an index of the attribute field $X_1$ of the first sample data source a and corresponding indexes of other different attribute fields $X_2, \ldots,$ and $X_n$ of the second sample data source a'.

Similar to the foregoing manner, the first obtaining module 130 obtains difference degrees between the index of each attribute field of the first sample data source a and corresponding indexes of all the attribute fields $X_1, X_2, \ldots,$ and $X_n$ of the second sample data source a'.

In the foregoing embodiment, a difference value is used to represent the difference degree. It may be understood that, in addition to using a manner of performing subtraction between the index of the attribute field $X_i$ of the first sample data source a and the index of each attribute field of the second sample data source a' to obtain a difference degree between the index of the attribute field $X_i$ of the first sample data source a and the index of each attribute field of the second sample data source a', the first obtaining module 130 may further use a ratio, an error ratio, or another data comparison manner to represent the difference degree. For example, in another embodiment, the first obtaining module 130 obtains the difference degree between the index of the attribute field $X_i$ of the first sample data source a and the index of each attribute field of the second sample data source a' in a data comparison manner such as dividing the index of the attribute field $X_i$ of the first sample data source a by the index of each attribute field of the second sample data source a', or performing subtraction between the index of the attribute field $X_i$ of the first sample data source a and the index of each attribute field of the second sample data source a' and dividing an obtained difference value by the index of the attribute field $X_i$ of the first sample data source a to obtain an error ratio, or dividing the index of the attribute field $X_i$ of the first sample data source a by the sum of the index of each attribute field of the second sample data source a' and the index of the attribute field $X_i$ of the first sample data source a. Therefore, how to acquire the difference degree is not limited herein.

It should be noted that when a difference value is used, an absolute value of the difference value is generally used to represent the difference degree.

The determining module 140 is configured to determine a decision value of the attribute field $X_i$ of the first data source A according to the difference degree between the index of the attribute field $X_i$ of the first sample data source a and the index of the same attribute field $X_i$ of the second sample data source a' and the difference degrees between the index of the attribute field $X_i$ of the first sample data source a and the indexes of the different attribute fields of the second sample data source a', and send the decision value of the attribute field $X_i$ of the first data source A to the mapping module 160.

For example, the determining module 140 uses the difference degree between the index of the attribute field $X_i$ of the first sample data source a and the index of the same attribute field $X_i$ of the second sample data source a' as a sample of a same attribute of the attribute field $X_i$ of the first data source A, and uses the difference degrees between the index of the attribute field $X_i$ of the first sample data source a and the indexes of the different attribute fields of the second sample data source a' as samples of different attributes of the attribute field $X_i$ of the first data source A. Further, a difference degree between the index of the attribute field $X_1$ of the first sample data source a and the index of the attribute field $X_1$ of the second sample data source a' is used as a sample of a same attribute of the attribute field $X_1$ of the first data source A, and difference degrees between the index of the attribute field $X_1$ of the first sample data source a and indexes of other attribute fields except $X_1$, that is, $X_2, \ldots,$ and $X_n$, of the second sample data source a' are used as samples of different attributes of the attribute field $X_1$ of the first data source A. Similarly, the determining module 140 obtains samples of a same attribute and samples of different attributes of other attribute fields $X_2, \ldots,$ and $X_n$ of the first data source A.

The determining module 140 may perform classified modeling on the foregoing obtained samples using a decision tree algorithm such as a C4.5 algorithm, to obtain the decision value of the attribute field $X_i$ of the first data source A, where the decision value is a difference degree threshold used to determine whether an attribute field and the attribute field $X_i$ of the first data source A represent a same attribute.

Preferably, the decision value is used as a criterion to determine whether an attribute field and the attribute field $X_i$ of the first data source A represent a same attribute. To reduce a calculation amount of subsequent determining, the decision value may be an error ratio, and in this case, the difference degree is also represented using an error ratio. For example, after obtaining a difference value between the index of each attribute field of the first sample data source a and the index of each attribute field of the second sample data source a', the determining module 140 dividing the difference value between the index of the attribute field $X_i$ of the first sample data source a and the index of each attribute field of the second sample data source a' by the index of the attribute field $X_i$ of the first sample data source a to obtain an error ratio of the index of the attribute field $X_i$ of the first sample data source a to the index of each of the attribute fields $X_1, X_2, \ldots,$ and $X_n$ of the second sample data source a'. The determining module 140 uses an error ratio between indexes of same attribute fields of the first sample data source and the second sample data source as a sample of a same attribute, and uses an error ratio between indexes of different attribute fields of the first sample data source and the second sample data source as a sample of different attributes. Further, an error ratio of the index of the attribute field $X_1$ of the first sample data source a to the index of the attribute field $X_1$ of the second sample data source a' is used as the sample of a same attribute of the attribute field $X_1$ of the first data source A. For example, the sample obtained by means of calculation according to the foregoing tables is "0.1%, 0.2%, 0.04%, 0%, 0.2%, 0%, 0.06%, 0%, and 0%". Error ratios of the index of the attribute field $X_1$ of the first sample data source a to the indexes of the other attribute fields $X_2, \ldots,$ and $X_n$ except $X_1$ of the second sample data source are used as the samples of different attributes of the attribute field $X_1$ of the first data source A. Similarly, the determining module 140 calculates error ratios of the index of each remaining attribute field $X_2, \ldots,$ and $X_n$ of the first sample data source a to the index of each attribute field of the second sample data source a', to obtain the samples of a same attribute and the samples of different attributes of the remaining attribute fields $X_2, \ldots,$ and $X_n$ of the first data source A.

Before performing classified modeling, the determining module 140 may further classify different error ratios into several error ratio levels according to a system-defined classification criterion, a classification criterion that is set by a user, or the error ratio situations of the foregoing samples of a same attribute and samples of different attributes. For example, the different error ratios are classified into the following six error ratio levels.

1. An error ratio is less than 1%;
2. An error ratio is less than 5%;
3. An error ratio is less than 10%;
4. An error ratio is less than 20%;
5. An error ratio is less than 50%; and
6. An error ratio is less than 100%.

The determining module 140 determines an optimal level critical error ratio from the foregoing level critical error ratios according to the foregoing obtained error ratio situations of the samples, and uses the optimal level critical error ratio as the decision value.

Further, a manner of determining the decision value is described exemplarily with reference to the foregoing level classification. The sample of a same attribute, obtained by the determining module 140, of the attribute field $X_1$ of the first data source A is "0.1%, 0.2%, 0.04%, 0%, 0.2%, 0%, 0.06%, 0%, 0%". In the following, for ease of description, only an error ratio between standard deviations in the samples is selected for description, that is, an error ratio between standard deviations in the sample of a same attribute of the attribute field $X_1$ of the first data source A is 0.1%. Error ratios between standard deviations in the samples of different attributes of the attribute field $X_1$ of the first data source A include error ratios of the standard deviation of the attribute field $X_1$ of the first sample data source to standard deviations of the attribute fields $X_2, \ldots,$ and $X_n$ of the second sample data source, where the error ratios between standard deviations in the samples of different attributes of the attribute field $X_1$ of the first data source A are respectively 100%, 100%, 85%, 60%, $\ldots,$ and 20%, and the minimum value of the error ratios between the standard deviations in the samples of different attributes of the attribute field $X_1$ of the first data source A is 20%. After determining that the error ratio between the standard deviations of same attributes of the attribute field $X_1$ of the first data source A is 0.1% and the error ratios between the standard deviations of different attributes of the attribute field $X_1$ of the first data source A are greater than or equal to 20%, the determining module 140 selects level critical error ratios between 0.1% and 20% from the foregoing six levels, that is, 1%, 5%, and 10%, and uses the level critical error ratios as possible optimal level critical error ratios. The determining module 140 determines an optimal level critical error ratio such as 5% from the foregoing three possible optimal level critical error ratios randomly or according to a received user instruction, and uses the optimal level critical error ratio as a decision value of a standard deviation of the attribute field $X_1$ of the first data source A.

Similarly, the determining module 140 determines an optimal level critical error ratio of another index of the attribute field $X_1$ from the foregoing level critical error ratios according to error ratios of the other index in the sample of a same attribute and the samples of different attributes of the attribute field $X_1$ of the first data source A, and uses the optimal level critical error ratio as a decision value of the other index of the attribute field $X_1$ of the first data source A. Similarly, the determining module 140 determines an optimal level critical error ratio of each index of the other attribute fields $X_2, \ldots,$ and $X_n$ from the foregoing level critical error ratios according to error ratio situations of the indexes in the samples of a same attribute and samples of different attributes of the other attribute fields $X_2, \ldots,$ and $X_n$ of the first data source A, and uses the optimal level critical error ratio as a decision value of the index of the other attribute fields $X_2, \ldots,$ and $X_n$ of the first data source A.

The determining module 140 obtains the decision value of the attribute field $X_i$ of the first data source A according to the foregoing decision value determining manner, which is, for example, further as follows. A decision value corresponding to an error ratio between standard deviations is 5%, a decision value corresponding to an error ratio between variances is 20%, and a decision value corresponding to an error ratio of standard errors of mean is 5%, that is, for an attribute field $Y_j$ of the second data source and the attribute field $X_i$ of the first data source, when an error ratio between standard deviations is less than 5%, an error ratio between variances is less than 20%, and an error ratio between standard errors of mean is less than 5%, it is considered that the attribute field $X_i$ of the first data source and the attribute field $Y_j$ of the second data source are same attributes, where j is a free variable, and j=1, 2, 3, . . . m.

The second obtaining module 150 is configured to obtain a difference degree between an index of the attribute field $X_i$ of the first data source A and the index of each of the attribute fields $Y_1, Y_2, \ldots,$ and $Y_m$ of the second data source B, and send the obtained difference degree to the mapping module 160.

For example, the second obtaining module 150 uses a difference value between the index of the attribute field $X_i$ of the first data source and the index of each of the attribute fields $Y_1, Y_2, \ldots,$ and $Y_m$ of the second data source, a ratio of the index of the attribute field $X_i$ of the first data source to the index of each of the attribute fields $Y_1, Y_2, \ldots,$ and $Y_m$ of the second data source, or an error ratio of the index of the attribute field $X_i$ of the first data source to the index of each of the attribute fields $Y_1, Y_2, \ldots,$ and $Y_m$ of the second data source as the difference degree between the index of the attribute field $X_i$ of the first data source and the index of each of the attribute fields $Y_1, Y_2, \ldots,$ and $Y_m$ of the second data source. A specific obtaining manner is similar to a manner of obtaining the difference degree by the first obtaining module 130, and details are not described herein.

The mapping module 160 is configured to map, to the attribute field $X_i$ of the first data source A, an attribute field that is of the second data source B and whose index and the index of the attribute field $X_i$ of the first data source A have a difference degree less than the decision value.

After the second obtaining module 150 obtains the difference degree between the index of the attribute field $X_i$ of the first data source and the index of each of the attribute fields $Y_1, Y_2, \ldots,$ and $Y_m$ of the second data source, the mapping module 160 compares each obtained difference degree with the decision value, to obtain the attribute field that is of the second data source and whose index and the index of the attribute field $X_i$ of the first data source have a difference degree less than the decision value, and maps the attribute field to the attribute field $X_i$ of the first data source A.

It should be noted that, in this embodiment of the present disclosure, when the second data source has no attribute field whose index and the attribute field $X_i$ of the first data source have a difference degree less than the decision value, it indicates that the second data source has no attribute field that is the same as the attribute field $X_i$ of the first data source, and in this case, no attribute field is mapped to the attribute field $X_i$ of the first data source.

Further, the difference degree between the attribute field $X_i$ of the first data source A and the index of each of the attribute fields $Y_1, Y_2, \ldots,$ and $Y_m$ of the second data source B is also represented using an error ratio between indexes when the decision value is represented in a form of an error ratio between indexes. The mapping module 160 compares each error ratio between indexes that is obtained by the second obtaining module 150 with the decision value obtained by the determining module 140, to obtain the attribute field that is of the second data source and whose index and the attribute field $X_i$ of the first data source have a difference degree less than the decision value. For example, a decision value of the attribute field $X_1$ of the first data source A is as follows. A decision value corresponding to an error ratio between standard deviations is 5%, a decision value corresponding to an error ratio between variances is 20%, and a decision value corresponding to an error ratio between standard errors of mean is 5%. In addition, error ratios of indexes of the attribute field $X_1$ of the first data source to indexes of the attribute field $Y_1$ of the second data source are sequentially 0.1%, 0.2%, 0.04%, 0%, 0.2%, 0%, 0.06%, 0%, and 0%, and error ratios of the indexes of the attribute field $X_1$ of the first data source to indexes of the attribute field $Y_2$ of the second data source are sequentially 100%, 100%, 100%, 0%, 35%, 0%, 100%, 0%, and 0%. By analogy, error ratios of the indexes of the attribute field $X_1$ of the first data source to indexes of other remaining attribute fields of the second data source are obtained. The foregoing error ratios between indexes are sequentially corresponding to an error ratio between standard deviations, an error ratio between variances, an error ratio between skewnesses, an error ratio between standard deviations of skewness, an error ratio between kurtoses, an error ratio between standard deviations of kurtosis, an error ratio between standard errors of mean, an error ratio between outliers, and an error ratio between extremums.

The mapping module 160 separately determines whether the foregoing obtained error ratio between standard deviations is less than 5%, whether the error ratio between variances is less than 20%, and whether the error ratio between standard errors of mean is less than 5%, and determines that the attribute field $Y_1$ that is of the second data source and whose error ratio between indexes meets the foregoing conditions represent a same attribute as the attribute field $X_1$ of the first data source, and the attribute field $Y_2$ that is of the second data source and whose error ratio between indexes does not meet the foregoing conditions is a different attribute from the attribute field $X_1$ of the first data source. By analogy, after determining an attribute relationship of whether the attribute field $X_1$ of the first data source and other remaining attribute fields of the second data source represent the same attribute, the mapping module 160 maps, to the attribute field $X_1$ of the first data source, the attribute field $Y_1$ that is of the second data source and is determined to represent the same attribute as the attribute field $X_1$, to implement integration of data in an attribute field $X_1$ of the first data source and data in the attribute field $Y_1$ of the second data source. Similarly, after determining an attribute relationship between other remaining attribute fields $X_2, \ldots,$ and $X_n$ of the first data source and each of the attribute fields $Y_1, Y_2, \ldots,$ and $Y_m$ of the second data source, the mapping module 160 maps, to the attribute field $X_1$ of the first data source, an attribute field $Y_j$ that is of the second data source and is determined to be the same as the attribute field $X_1$.

If difference values are directly compared (that is, a difference value is used to represent a difference degree), because the difference value is an absolute value, a difference between difference degrees between an index of an attribute field of a first data source and indexes of different attribute fields of a second data source may be extremely large, for example, 0.0001 and 10000. In contrast, if a manner of comparing error ratios is used (that is, an error ratio is used to represent the difference degree), because an error ratio is a relative value, a difference between error ratios of the index of the attribute field of the first data source to the indexes of the different attribute fields of the second data source is definitely from 0% to 100%, and therefore, when the error ratios are compared with a decision value, calculation value is controlled between 1% and 100%, thereby greatly reducing a calculation amount.

Figure 2:
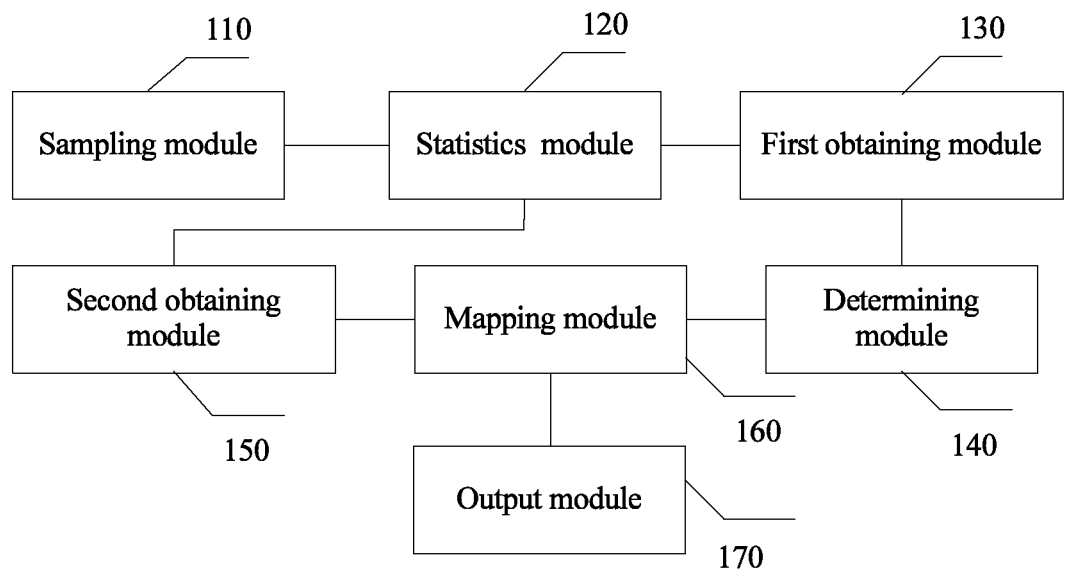
FIG. 2 is a schematic structural diagram of a data integration apparatus according to another embodiment of this application.

Referring to FIG. 2, FIG. 2 is a schematic structural diagram of a data integration apparatus according to another embodiment of this application. Compared with the foregoing embodiment, the data integration apparatus in this embodiment further includes an output module 170. The output module 170 is configured to determine whether a quantity of attribute fields that are of the second data source B and whose indexes and the index of the attribute field $X_i$ of the first data source A have difference degrees less than the decision value is greater than or equal to 2, and when the quantity of attribute fields that are of the second data source B and whose indexes and the index of the attribute field $X_i$ of the first data source A have difference degrees less than the decision value is greater than or equal to 2, output the attribute fields that are of the second data source B and whose indexes and the index of the attribute field $X_i$ of the first data source A have difference degrees less than the decision value for a user to select. The mapping module 160 is configured to map an attribute field, selected by the user, of the second data source to the attribute field $X_i$ of the first data source. For example, when difference degrees between the index of the attribute field $X_1$ of the first data source and indexes of both the attribute fields $Y_1$ and $Y_2$ of the second data source have difference degrees less than the decision value, the output module 170 outputs the attribute fields $Y_1$ and $Y_2$ of the second data source to the user such that the user finally determines that the attribute field $Y_1$ or $Y_2$ represent a same attribute as the attribute field $X_1$ of the first data source. The mapping module 160 maps the attribute field $Y_1$ of the second data source to the attribute field $X_1$ of the first data source when the user selects to determine that the attribute field $Y_1$ of the second data source represent the same attribute as the attribute field $X_1$ of the first data source.

Alternatively, in another embodiment, the data integration apparatus may not include an output module 170. The mapping module 160 of the data integration apparatus voluntarily selects an attribute field that is of the second data source and whose difference degree with the attribute field $X_i$ of the first data source has the minimum degree of deviation from the decision value as a same attribute as the attribute field $X_i$ when a quantity of attribute fields that are of the second data source and whose indexes and the index of the attribute field $X_i$ of the first data source have difference degrees less than the decision value is greater than or equal to 2. Therefore, a manner of determining, by the data integration apparatus, the same attribute as the attribute field $X_i$ of the first data source from at least two attribute fields that are of the second data source and whose difference degrees are less than the decision value is not limited in this application.

Figure 3:
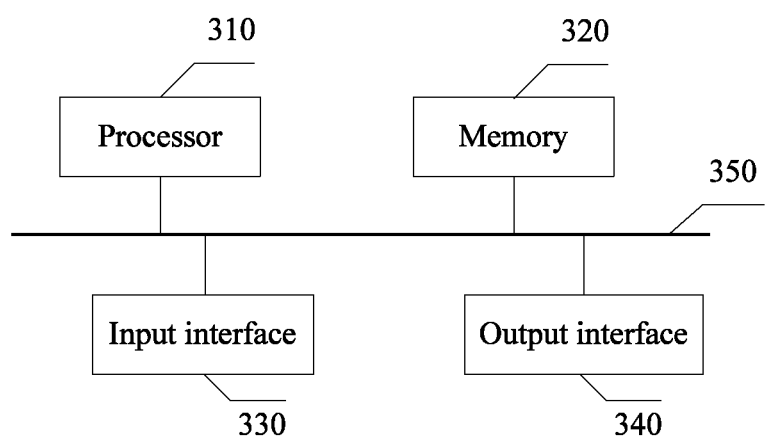
FIG. 3 is a schematic structural diagram of a data integration apparatus according to still another embodiment this application.

Referring to FIG. 3, FIG. 3 is a schematic structural diagram of a data integration apparatus according to still another embodiment this application. The data integration apparatus includes a processor 310, a memory 320, an input interface 330, an output interface 340, and a bus 350, where the processor 310, the memory 320, the input interface 330, and the output interface 340 are connected using the bus 350.

The memory 320 is configured to store a computer instruction executed by the processor 310 and data that needs to be stored when the processor 310 works.

The input interface 330 is configured to receive a first data source A and a second data source B, and send the first data source A and the second data source B to the processor 310.

The output interface 340 is configured to output data and information that are of the processor 310, for example, output the first data source A that is obtained after the processor 310 maps, to an attribute field $X_i$ of the first data source A, an attribute field that is of the second data source B and that is the same as the attribute field $X_i$ of the first data source A.

The processor 310 executes the computer instruction stored in the memory 320, and is configured to sample the first data source A at least twice to obtain a first sample data source a and a second sample data source a', separately calculate an index of each attribute field $X_1, X_2, \ldots,$ and $X_n$ of the first data source A, an index of each attribute field $X_1, X_2, \ldots,$ and $X_n$ of the first sample data source a, an index of each attribute field $X_1, X_2, \ldots,$ and $X_n$ of the second sample data source a', and an index of each attribute field $Y_1, Y_2, \ldots,$ and $Y_m$ of the second data source B, where n is a quantity of attribute fields of the first data source A, the first sample data source a, and the second sample data source a', m is a quantity of attribute fields of the second data source B, and the index is used to represent a data feature of the attribute field, for example, including at least one of a standard deviation, a variance, a skewness, a standard deviation of skewness, a kurtosis, a standard deviation of kurtosis, a standard error of mean, an outlier, or an extremum, obtain a difference degree between an index of an attribute field $X_i$ of the first sample data source a and an index of a same attribute field $X_i$ of the second sample data source a', and difference degrees between the index of the attribute field $X_i$ of the first sample data source a and indexes of different attribute fields of the second sample data source a', where i is a free variable, i=1, 2, 3, . . . n, and the different attribute fields are all attribute fields except $X_i$ in the attribute fields of the second sample data source a', determine a decision value of the attribute field $X_i$ of the first data source A according to the difference degree between the index of the attribute field $X_i$ of the first sample data source a and the index of the same attribute field $X_i$ of the second sample data source a' and the difference degrees between the index of the attribute field $X_i$ of the first sample data source a and the indexes of the different attribute fields of the second sample data source a', where the decision value is a difference degree threshold used to determine whether an attribute field represent a same attribute as the attribute field $X_i$ of the first data source A, obtain difference degrees between an index of the attribute field $X_i$ of the first data source A and the indexes of all the attribute fields $Y_1, Y_2, \ldots$, and $Y_m$ of the second data source B, and map, to the attribute field $X_i$ of the first data source A, an attribute field that is of the second data source B and whose index and the index of the attribute field $X_i$ of the first data source A have a difference degree less than the decision value.

Further, the data integration apparatus in this embodiment is configured to integrate data, of a same attribute, in the first data source A and the second data source B, where the first data source A and the second data source B may be but are not limited to databases or files, as described in the foregoing embodiment.

In this embodiment, there are multiple records in both the first data source A and the second data source B, and each record has multiple attribute fields. For example, both the first data source A and the second data source B that are used to record information about different clients have attribute fields such as a phone number and an age, and phone numbers and ages of the different clients are correspondingly recorded in the information about the clients. In practical application, for example, in a service system of a telecommunications operator, there may be hundreds of thousands of or even more than ten million records included in the first data source and the second data source, and each record may include more than one thousand attribute fields. It may be understood that attribute fields of the data source are mutually different to distinguish different attributes.

The processor 310 samples the first data source A at least twice. In this embodiment, preferably, random sampling is performed twice, data obtained at the first time of sampling is the first sample data source a, and data obtained at the second time of sampling is the second sample data source a'. Considering accuracy of a subsequent decision and a calculation amount of the data integration apparatus, a sampling scale is generally 10% to 30% of a total quantity of records in the data source each time, and is preferably 20%. For example, the first data source A has totally 10 million records, and 2 million records are randomly extracted from the first data source A each time, to separately obtain the first sample data source a and the second sample data source a'.

The processor 310 separately calculate the indexes of all the attribute fields of the first data source A, the second data source B, and the first sample data source a and the second sample data source a' that are sampled from the first data source. For example, the first data source A includes 10 million records, the second data source B includes 8 million records, and the first sample data source a and the second sample data source a' each include 2 million records. The processor 310 calculate a feature of specific data of each attribute field in the 10 million records of the first data source A, and uses the feature as an index of each attribute field of the first data source A, where the feature is at least one of a standard deviation, a variance, a skewness, a standard deviation of skewness, a kurtosis, a standard deviation of kurtosis, a standard error of mean, an outlier, or an extremum. Similarly, the processor 310 calculate an index of each attribute field of the second data source B according to the 8 million records of the second data source B, calculates an index of each attribute field of the first sample data source a according to the 2 million records of the first sample data source a, and calculates an index of each attribute field of the second sample data source a' according to the 2 million records of the second sample data source a'.

In this embodiment, it is assumed that the processor 310 calculates totally nine indexes including a standard deviation, a variance, a skewness, a standard deviation of skewness, a kurtosis, a standard deviation of kurtosis, a standard error of mean, an outlier, and an extremum, the first sample data source a and the second sample data source a' each include six attribute fields, and index of the six attribute fields are shown in the foregoing Table 1 and Table 2. The processor 310 performs subtraction between the foregoing index of the attribute field $X_1$ of the first sample data source a and corresponding indexes of all the attribute fields $X_1, X_2, \ldots$, and $X_n$ of the second sample data source a', to obtain difference degrees between the foregoing index of the attribute field $X_1$ of the first sample data source a and the corresponding indexes of all the attribute fields $X_1, X_2, \ldots$, and $X_n$ of the second sample data source a'.

Similar to the foregoing manner, the processor 310 obtains difference degrees between the index of each attribute field of the first sample data source and corresponding indexes of all the attribute fields $X_1, X_2, \ldots$, and $X_n$ of the second sample data source a'.

It may be understood that, the difference degree is used to represent a size of a difference between compared indexes. In practical application, the difference degree is not limited to being represented using a difference value between the compared indexes in the foregoing manner, and may also be represented using a ratio between the compared indexes, an error ratio between the compared indexes, another data comparison manner, or the like. For example, the processor 310 obtains the difference degree between the index of the attribute field $X_i$ of the first sample data source a and the index of each attribute field of the second sample data source a' in a data comparison manner such as dividing the index of the attribute field $X_i$ of the first sample data source a by the index of each attribute field of the second sample data source a', or performing subtraction between the index of the attribute field $X_i$ of the first sample data source a and the index of each attribute field of the second sample data source a' and dividing an obtained difference value by the index of the attribute field $X_i$ of the first sample data source a to obtain an error ratio, or dividing the index of the attribute field $X_i$ of the first sample data source a by the sum of the index of each attribute field of the second sample data source a' and the index of the attribute field $X_i$ of the first sample data source a. Therefore, how to acquire the difference degree is not limited herein.

The processor 310 uses a difference degree between indexes of same attribute fields of the first sample data source and the second sample data source as a sample of a same attribute, and uses a difference degree between indexes of different attribute fields of the first sample data source and the second sample data source as a sample of different attributes. Further, a difference degree between the index of the attribute field $X_1$ of the first sample data source a and the index of the attribute field $X_1$ of the second sample data source a' is used as a sample of a same attribute of an attribute field $X_1$ of the first data source A, and difference degrees between the index of the attribute field $X_1$ of the first sample data source a and indexes of other attribute fields except $X_1$, that is, $X_2, \ldots,$ and $X_n$, of the second sample data source a' are used as samples of different attributes of the attribute field $X_1$ of the first data source A. Similarly, the processor 310 obtains samples of a same attribute and samples of different attributes of other attribute fields $X_2, \ldots,$ and $X_n$ of the first data source A.

The processor 310 may perform classified modeling on the foregoing obtained samples using a decision tree algorithm such as a C4.5 algorithm, to obtain the decision value of the attribute field $X_i$ of the first data source A, where the decision value is a difference degree threshold used to determine whether an attribute field and the attribute field $X_i$ of the first data source A represent a same attribute.

Preferably, the decision value is used as a criterion to determine whether an attribute field and the attribute field $X_i$ of the first data source A represent a same attribute. To reduce a calculation amount of subsequent determining, the decision value may be an error ratio, and in this case, the difference degree is also represented using an error ratio. For example, the processor 310 dividing the difference value between the index of the attribute field $X_i$ of the first sample data source a and the index of each attribute field of the second sample data source a' by the index of the attribute field $X_i$ of the first sample data source a to obtain as an error ratio of the index of the attribute field $X_i$ of the first sample data source a to the index of each of the attribute fields $X_1$, $X_2, \ldots,$ and $X_n$ of the second sample data source a'. The processor 310 uses an error ratio between indexes of same attribute fields of the first sample data source and the second sample data source as a sample of a same attribute, and uses an error ratio between indexes of different attribute fields of the first sample data source and the second sample data source as a sample of different attributes.

Before performing classified modeling, the processor 310 may further classify different error ratios into several error ratio levels according to a system-defined classification criterion, a classification criterion that is set by a user, or the error ratio situations of the foregoing samples of a same attribute and samples of different attributes. The processor 310 determines an optimal level critical error ratio from classified level critical error ratios according to the obtained error ratio situations of the samples, and uses the optimal level critical error ratio as the decision value. A specific manner of determining, by the processor 310, the optimal level critical error ratio from the classified level critical error ratios according to the obtained error ratio situations of the samples is similar to a determining manner of the determining module 140 in the foregoing embodiment, and details are not described herein.

The processor 310 uses a difference value between the index of the attribute field $X_i$ of the first data source and the index of each of the attribute fields $Y_1, Y_2, \ldots,$ and $Y_m$ of the second data source, a ratio of the index of the attribute field $X_i$ of the first data source to the index of each of the attribute fields $Y_1, Y_2, \ldots,$ and $Y_m$ of the second data source, or an error ratio of the index of the attribute field $X_i$ of the first data source to the index of each of the attribute fields $Y_1, Y_2, \ldots,$ and $Y_m$ of the second data source as the difference degree between the index of the attribute field $X_i$ of the first data source and the index of each of the attribute fields $Y_1, Y_2, \ldots,$ and $Y_m$ of the second data source. A specific obtaining manner is similar to the foregoing manner of obtaining the difference degree between the indexes of all the attribute fields of the first sample data source and the second sample data source, and details are not described herein.

After obtaining the difference degree between the index of the attribute field $X_i$ of the first data source and the index of each of the attribute fields $Y_1, Y_2, \ldots,$ and $Y_m$ of the second data source, the processor 310 compares each obtained difference degree with the decision value, to obtain the attribute field that is of the second data source and whose index and the index of the attribute field $X_i$ of the first data source have a difference degree less than the decision value, and maps the attribute field to the attribute field $X_i$ of the first data source A.

Further, the difference degree between the attribute field $X_i$ of the first data source A and the index of each of the attribute fields $Y_1, Y_2, \ldots,$ and $Y_m$ of the second data source B is also represented using an error ratio between indexes when the decision value is represented in a form of an error ratio between indexes. The processor 310 compares an error ratio between the indexes of all the attribute fields of the first data source and the second data source with the decision value, to obtain the attribute field that is of the second data source and whose index and the attribute field $X_i$ of the first data source have a difference degree less than the decision value. For example, the decision value of the attribute field $X_i$ of the first data source A is as follows. A decision value corresponding to an error ratio between standard deviations is 5%, a decision value corresponding to an error ratio between variances is 20%, and a decision value corresponding to an error ratio between standard errors of mean is 5%. The processor 310 separately determines whether an error ratio of a standard deviation of the attribute field $X_1$ of the first data source to a standard deviation of each of the attribute fields $Y_1, Y_2, \ldots,$ and $Y_m$ of the second data source is less than 5%, whether an error ratio between variances is less than 20%, and whether a standard error of mean is less than 5%, and determines that an attribute field that is of the second data source and whose error ratio between indexes meets the foregoing conditions represent a same attribute as the attribute field $X_1$ of the first data source, and an attribute field that is of the second data source and whose error ratio between indexes does not meet the foregoing conditions is a different attribute from the attribute field $X_1$ of the first data source. The processor 310 maps, to the attribute field $X_i$ of the first data source, the attribute field that is of the second data source and is determined to be the same as the attribute field $X_i$.

In another preferable embodiment, the processor 310 is further configured to output, by the output interface 340, the attribute fields that are of the second data source B and whose indexes and the index of the attribute field $X_i$ of the first data source A have difference degrees less than the decision value for a user to select when a quantity of attribute fields that are of the second data source B and whose indexes and the index of the attribute field $X_i$ of the first data source A have difference degrees less than the decision value is greater than or equal to 2. Alternatively, in another optimal embodiment, when a quantity of attribute fields that are of the second data source B and whose indexes and the index of the attribute field $X_i$ of the first data source A have difference degrees less than the decision value is greater than or equal to 2, the processor may voluntarily select an attribute field that is of the second data source and whose index and the index of the attribute field $X_i$ of the first data source have a difference degree that has the minimum degree of deviation from the decision value as a same attribute as the attribute field $X_i$. Therefore, a manner of determining, by the processor 310, the same attribute as the attribute field $X_i$ of the first data source from at least two attribute fields that are of the second data source and whose difference degrees are less than the decision value is not limited in this application.

Figure 4:
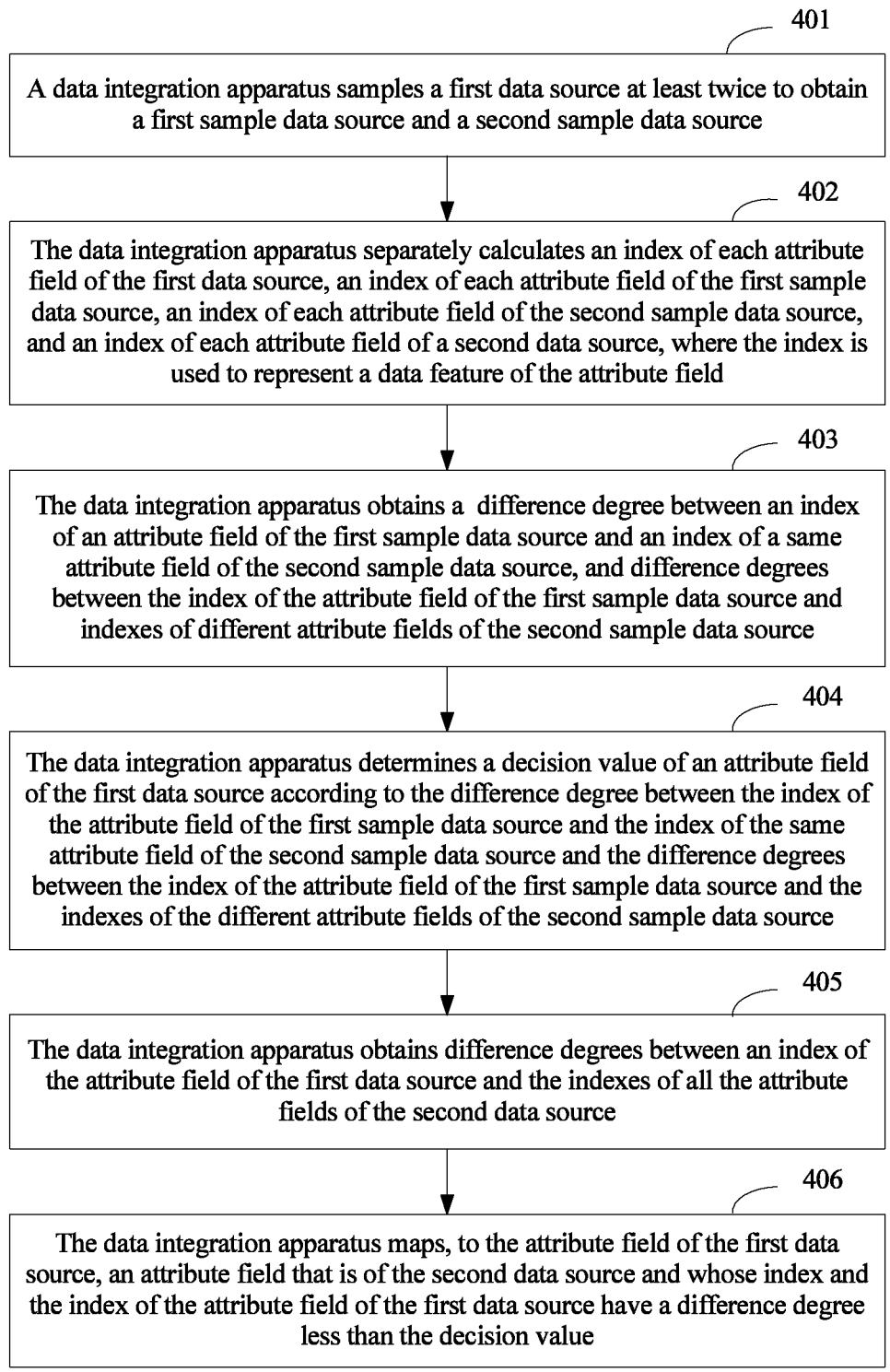
FIG. 4 is a flowchart of a data integration method according to an embodiment of this application.

Referring to FIG. 4, FIG. 4 is a flowchart of a data integration method according to an embodiment of this application. In this embodiment, the data integration method includes the following steps.

Step 401: A data integration apparatus samples a first data source at least twice to obtain a first sample data source and a second sample data source.

Further, the first data source is A, the first sample data source is a and the second sample data source is a'.

The data integration method in this application is used to integrate data, of a same attribute, in the first data source A and a second data source B, where the first data source A and the second data source B may be but are not limited to databases or files, as described in the foregoing embodiment.

In this embodiment, there are multiple records in both the first data source A and the second data source B, and each record has multiple attribute fields. For example, both the first data source A and the second data source B that are used to record information about different clients have attribute fields such as a phone number and an age, and phone numbers and ages of the different clients are correspondingly recorded in the information about the clients. In practical application, for example, in a service system of a telecommunications operator, there may be hundreds of thousands of or even more than ten million records included in the first data source and the second data source, and each record may include more than one thousand attribute fields. It may be understood that attribute fields of the data source are mutually different to distinguish different attributes.

The data integration apparatus samples the first data source A at least twice. In this embodiment, preferably, random sampling is performed twice, data obtained at the first time of sampling is the first sample data source a, and data obtained at the second time of sampling is the second sample data source a'. Considering accuracy of a subsequent decision and a calculation amount of the data integration apparatus, a sampling scale is generally 10% to 30% of a total quantity of records in the data source each time, and is preferably 20%. For example, the first data source A has totally 10 million records, and 2 million records are randomly extracted from the first data source A each time, to separately obtain the first sample data source a and the second sample data source a'.

Step 402: The data integration apparatus separately calculates an index of each attribute field of the first data source, an index of each attribute field of the first sample data source, an index of each attribute field of the second sample data source, and an index of each attribute fields of a second data source, where the index is used to represent a data feature of the attribute field.

The data integration apparatus separately calculates an index of each attribute field $X_1, X_2, \ldots,$ and $X_n$ of the first data source A, an index of each attribute field $X_1, X_2, \ldots,$ and $X_n$ of the first sample data source a, an index of each attribute field $X_1, X_2, \ldots,$ and $X_n$ of the second sample data source a', and an index of each attribute fields $Y_1, Y_2, \ldots,$ and $Y_m$ of a second data source B, where n is a quantity of attribute fields of the first data source A, the first sample data source a, and the second sample data source a', m is a quantity of attribute fields of the second data source B, and the index is used to represent a data feature of the attribute field, for example, includes at least one of a standard deviation, a variance, a skewness, a standard deviation of skewness, a kurtosis, a standard deviation of kurtosis, a standard error of mean, an outlier, or an extremum.

The data integration apparatus separately calculates the index of each the attribute field of the first data source A, the second data source B, and the first sample data source a and the second sample data source a' that are sampled from the first data source A. For example, the first data source A includes 10 million records, the second data source B includes 8 million records, and the first sample data source a and the second sample data source a' each include 2 million records. The data integration apparatus calculates a feature of specific data of each attribute field in the 10 million records of the first data source A, and uses the feature as an index of each attribute field of the first data source A. For example, the feature includes at least one of a standard deviation, a variance, a skewness, a standard deviation of skewness, a kurtosis, a standard deviation of kurtosis, a standard error of mean, an outlier, or an extremum. Similarly, the data integration apparatus calculates an index of each attribute field of the second data source B according to the 8 million records of the second data source B, calculates an index of each attribute field of the first sample data source a according to the 2 million records of the first sample data source a, and calculates an index of each attribute field of the second sample data source a' according to the 2 million records of the second sample data source a'.

Step 403: The data integration apparatus obtains a difference degree between an index of an attribute field of the first sample data source and an index of a same attribute field of the second sample data source, and difference degrees between the index of the attribute field of the first sample data source and indexes of different attribute fields of the second sample data source.

The data integration apparatus obtains a difference degree between an index of an attribute field $X_i$ of the first sample data source a and an index of a same attribute field $X_i$ of the second sample data source a', and difference degrees between the index of the attribute field $X_i$ of the first sample data source a and indexes of different attribute fields of the second sample data source a', where the different attribute fields are all attribute fields except $X_i$ in the attribute fields of the second sample data source a'.

For example, it is assumed that the data integration apparatus calculates totally nine indexes including a standard deviation, a variance, a skewness, a standard deviation of skewness, a kurtosis, a standard deviation of kurtosis, a standard error of mean, an outlier, and an extremum, the first sample data source a and the second sample data source a' each include six attribute fields, and index of the six attribute fields are shown in the foregoing Table 1 and Table 2. The data integration apparatus performs subtraction between the foregoing index of the attribute field $X_1$ of the first sample data source a and corresponding indexes of all the attribute fields $X_1, X_2, \ldots,$ and $X_n$ of the second sample data source a', to obtain difference degrees between the foregoing index of the attribute field $X_1$ of the first sample data source a and the corresponding indexes of all the attribute fields $X_1, X_2, \ldots,$ and $X_n$ of the second sample data source a'.

Similar to the foregoing manner, the data integration apparatus obtains difference degrees between the index of each attribute field of the first sample data source and corresponding indexes of all the attribute fields $X_1, X_2, \ldots,$ and $X_n$ of the second sample data source a'.

In the foregoing embodiment, a difference value is used to represent the difference degree. It may be understood that, the data integration apparatus may also use a ratio, an error ratio, or another data comparison manner to represent the difference degree. For example, in another embodiment, the data integration apparatus obtains the difference degree between the index of the attribute field $X_i$ of the first sample data source a and the index of each attribute field of the second sample data source a' in a data comparison manner such as dividing the index of the attribute field $X_i$ of the first sample data source a by the index of each attribute field of the second sample data source a', or performing subtraction between the index of the attribute field $X_i$ of the first sample data source a and the index of each attribute field of the second sample data source a' and dividing an obtained difference value by the index of the attribute field $X_i$ of the first sample data source a to obtain an error ratio, or dividing the index of the attribute field $X_i$ of the first sample data source a by the sum of the index of each attribute field of the second sample data source a' and the index of the attribute field $X_i$ of the first sample data source a. Therefore, how to acquire the difference degree is not limited herein.

Step 404: The data integration apparatus determines a decision value of an attribute field of the first data source according to the difference degree between the index of the attribute field of the first sample data source and the index of the same attribute field of the second sample data source and the difference degrees between the index of the attribute field of the first sample data source and the indexes of the different attribute fields of the second sample data source.

The data integration apparatus determines a decision value of an attribute field $X_i$ of the first data source A according to the difference degree between the index of the attribute field $X_i$ of the first sample data source a and the index of the same attribute field $X_i$ of the second sample data source a' and the difference degrees between the index of the attribute field $X_i$ of the first sample data source a and the indexes of the different attribute fields of the second sample data source a'.

For example, the data integration apparatus uses a difference degree between indexes of same attribute fields of the first sample data source and the second sample data source as a sample of a same attribute, and uses a difference degree between indexes of different attribute fields of the first sample data source and the second sample data source as a sample of different attributes. Further, a difference degree between the index of the attribute field $X_1$ of the first sample data source a and the index of the attribute field $X_1$ of the second sample data source a' is used as a sample of a same attribute of an attribute field $X_1$ of the first data source A, and difference degrees between the index of the attribute field $X_1$ of the first sample data source a and indexes of other attribute fields except $X_1$, that is, $X_2, \ldots,$ and $X_n$, of the second sample data source a' are used as samples of different attributes of the attribute field $X_1$ of the first data source A. Similarly, the data integration apparatus obtains samples of a same attribute and samples of different attributes of other attribute fields $X_2, \ldots,$ and $X_n$ of the first data source A.

The data integration apparatus performs classified modeling on the foregoing obtained samples using a decision tree algorithm such as a C4.5 algorithm, to obtain the decision value of the attribute field $X_i$ of the first data source A, where the decision value is a difference degree threshold used to determine whether an attribute field and the attribute field $X_i$ of the first data source A represent a same attribute.

Preferably, the decision value is used as a criterion to determine whether an attribute field and the attribute field $X_i$ of the first data source A represent a same attribute. To reduce a calculation amount of subsequent determining, the decision value may be an error ratio, and in this case, the difference degree is also represented using an error ratio. For example, the data integration apparatus dividing the difference value between the index of the attribute field $X_i$ of the first sample data source a and the index of each attribute field of the second sample data source a' by the index of the attribute field $X_i$ of the first sample data source a to obtain an error ratio of the index of the attribute field $X_i$ of the first sample data source a to the index of each of the attribute fields $X_1, X_2, \ldots,$ and $X_n$ of the second sample data source a'. The data integration apparatus uses an error ratio between indexes of same attribute fields of the first sample data source and the second sample data source as a sample of a same attribute, and uses an error ratio between indexes of different attribute fields of the first sample data source and the second sample data source as a sample of different attributes.

Before performing classified modeling, the data integration apparatus may further classify different error ratios into several error ratio levels according to a system-defined classification criterion, a classification criterion that is set by a user, or the error ratio situations of the foregoing samples of a same attribute and samples of different attributes. The data integration apparatus determines an optimal level critical error ratio from classified level critical error ratios according to the obtained error ratio situations of the samples, and uses the optimal level critical error ratio as the decision value. A specific manner of determining, by the data integration apparatus, the optimal level critical error ratio from the classified level critical error ratios according to the obtained error ratio situations of the samples is similar to the determining manner in the foregoing embodiment, and details are not described herein.

Step 405: The data integration apparatus obtains difference degrees between an index of the attribute field of the first data source and the indexes of each attribute field of the second data source.

The data integration apparatus obtains difference degrees between an index of the attribute field $X_i$ of the first data source A and the indexes of each attribute field $Y_1, Y_2, \ldots,$ and $Y_m$ of the second data source B.

The data integration apparatus uses a difference value between the index of the attribute field $X_i$ of the first data source and the index of each of the attribute fields $Y_1, Y_2, \ldots,$ and $Y_m$ of the second data source, a ratio of the index of the attribute field $X_i$ of the first data source to the index of each of the attribute fields $Y_1, Y_2, \ldots,$ and $Y_m$ of the second data source, or an error ratio of the index of the attribute field $X_i$ of the first data source to the index of each of the attribute fields $Y_1, Y_2, \ldots,$ and $Y_m$ of the second data source as the difference degree between the index of the attribute field $X_i$ of the first data source and the index of each of the attribute fields $Y_1, Y_2, \ldots,$ and $Y_m$ of the second data source. A specific obtaining manner is similar to that in the foregoing step 403, and details are not described herein.

Step 406: The data integration apparatus maps, to the attribute field of the first data source, an attribute field that is of the second data source and whose index and the index of the attribute field of the first data source have a difference degree less than the decision value.

The data integration apparatus maps, to the attribute field $X_i$ of the first data source A, an attribute field that is of the second data source B and whose index and the index of the attribute field $X_i$ of the first data source A have a difference degree less than the decision value.

After obtaining the difference degree between the index of the attribute field $X_i$ of the first data source and the index of each of the attribute fields $Y_1, Y_2, \ldots,$ and $Y_m$ of the second data source, the data integration apparatus compares each obtained difference degree with the decision value, to obtain the attribute field that is of the second data source and whose index and the index of the attribute field $X_i$ of the first data source have a difference degree less than the decision value, and maps the attribute field to the attribute field $X_i$ of the first data source A.

Further, the data integration apparatus compares the decision value with the error ratio, obtained in step 405, of the index of the attribute field $X_i$ of the first data source A to the index of each of the attribute fields $Y_1, Y_2, \ldots,$ and $Y_m$ of the second data source B, to obtain the attribute field that is of the second data source and whose index and the attribute field $X_i$ of the first data source have a difference degree less than the decision value when the decision value is an error ratio between indexes. For example, the decision value of the attribute field $X_i$ of the first data source A is as follows. A decision value corresponding to an error ratio between standard deviations is 5%, a decision value corresponding to an error ratio between variances is 20%, and a decision value corresponding to an error ratio between standard errors of mean is 5%. The data integration apparatus separately determines whether an error ratio of the index of the attribute field $X_i$ of the first data source to a standard deviation of each of the attribute fields $Y_1, Y_2, \ldots,$ and $Y_m$ of the second data source is less than 5%, whether an error ratio between variances is less than 20%, and whether a standard error of mean is less than 5%, and determines that an attribute field that is of the second data source and whose error ratio between indexes meets the foregoing conditions represent a same attribute as the attribute field $X_i$ of the first data source, and an attribute field that is of the second data source and whose error ratio between indexes does not meet the foregoing conditions is a different attribute from the attribute field $X_i$ of the first data source. The data integration apparatus maps, to the attribute field $X_i$ of the first data source, the attribute field that is of the second data source and is determined to be the same as the attribute field $X_i$ of the first data source.

In another preferable embodiment, after obtaining the attribute field that is of the second data source and whose index and the index of the attribute field $X_i$ of the first data source have a difference degree less than the decision value, the data integration apparatus further determines whether a quantity of attribute fields that are of the second data source B and whose indexes and the index of the attribute field $X_i$ of the first data source A have difference degrees less than the decision value is greater than or equal to 2, and if the quantity of attribute fields that are of the second data source B and whose indexes and the index of the attribute field $X_i$ of the first data source A have difference degrees less than the decision value is greater than or equal to 2, the data integration apparatus outputs the attribute fields that are of the second data source B and whose indexes and the index of the attribute field $X_i$ of the first data source A have difference degrees less than the decision value for a user to select, and maps, to the attribute field $X_i$ of the first data source, an attribute field that is of the second data source and that is selected by the user. Alternatively, in still another embodiment, the data integration apparatus may voluntarily select an attribute field that is of the second data source and whose index and the index of the attribute field $X_i$ of the first data source have a difference degree that has the minimum degree of deviation from the decision value as a final attribute the same as the attribute field $X_i$ if a quantity of attribute fields that are of the second data source and whose indexes and the index of the attribute field $X_i$ of the first data source have difference degrees less than the decision value is greater than or equal to 2. Therefore, a manner of determining, by the data integration apparatus, the same attribute as the attribute field $X_i$ of the first data source from at least two attribute fields that are of the second data source and whose difference degrees are less than the decision value is not limited in this application.

For ease of description, in all the foregoing embodiments, the first data source is sampled only twice, and the decision value of the attribute field of the first data source is determined according to data in two times of sampling. However, in this application, it cannot be limited that the first data source can be sampled only twice, and in another embodiment, the first data source may be sampled more than three times, and a difference degree between an index of an attribute field of a sample data source obtained in one time of the sampling and an index of an attribute field of each of remaining sample data sources is obtained in a manner similar to the foregoing manner of obtaining the difference degree between indexes, to further obtain a more accurate decision value of the attribute field of the first data source. Obviously, this specific manner of acquiring the decision value can be derived by persons skilled in the art according to the foregoing manner of sampling twice. Therefore, details are not described herein.

In the foregoing embodiments of this application, when data of a second data source needs to be mapped to a first data source, sampling is performed at least twice in the first data source to obtain a first sample data source and a second sample data source. Then calculates an index of each attribute field of each of the two sample data sources, and a difference degree between an attribute field of the first data source and each attribute field of the second data source is obtained. Then a decision value of the attribute field of the first data source is determined according to a difference degree between an index of the attribute field of the first sample data source and an index of a same attribute field of the second sample data source and difference degrees between the index of the attribute field of the first sample data source and indexes of different attribute fields of the second sample data source. Then an attribute field that is of the second data source and whose index and the attribute field of the first data source have a difference degree less than the decision value is mapped to the attribute field of the first data source. Because in the technical solution of this application, automatic mapping of an attribute field of a data source to a same attribute field of another data source can be implemented, it is more convenient than data integration that is manually implemented, and efficiency is significantly improved.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

What is claimed is:

1. A data integration apparatus, comprising:
a processor;
an input interface coupled to the processor and configured to provide a first data source (A) and a second data source (B) for the processor; and
an output interface coupled to the processor,
a memory coupled to the processor and storing instructions that, when executed by the processor, cause the data integration apparatus to:
sample the A at least twice to obtain a first sample data source (a) and a second sample data source (a');
separately calculate an index of each attribute field ($X_k$) of the A, an index of each attribute field ($X_k$) of the a, an index of each attribute field ($X_k$) of the a', and an index of each attribute field ($Y_j$) of the B, wherein 1≤k≤n, wherein 1≤j≤m, wherein n is a quantity of attribute fields of the A, the a, and the a', wherein m is a quantity of attribute fields of the B, and wherein each of the index $X_k$ and the index $Y_j$ is used to represent a data feature of the attribute field;
obtain a difference degree between an index of an attribute field ($X_i$) of the a and an index of a same attribute field $X_i$ of the a', and difference degrees between the index of the attribute field $X_i$ of the a and indexes of different attribute fields of the a', wherein i is a free variable, wherein i=1, 2, 3, . . . , n, and wherein the different attribute fields are all attribute fields except $X_i$ in the attribute fields of the a';
determine a decision value of an attribute field $X_i$ of the A according to the difference degree between the index of the attribute field $X_i$ of the a and the index of the same attribute field $X_i$ of the a' and the difference degrees between the index of the attribute field $X_i$ of the a and the indexes of the different attribute fields of the a' by:
setting the difference degree between the index of the attribute field $X_i$ of the a and the index of the same attribute field $X_i$ of the a' as a sample of a same attribute;
setting the difference degrees between the index of the attribute field $X_i$ of the a and the indexes of the different attribute fields of the a' as samples of different attributes; and
performing classified modeling on the sample of the same attribute and the samples of different attributes using a decision tree algorithm to obtain the decision value of the attribute field $X_i$ of the A, wherein the decision value is a difference degree threshold used to determine whether an attribute field and the attribute field $X_i$ of the A represent a same attribute;
obtain difference degrees between the index of the attribute field $X_i$ of the A and the indexes of all the attribute fields of the B; and
map, to the attribute field $X_i$ of the A, an attribute field that is of the B and whose index and the index of the attribute field $X_i$ of the A comprise a difference degree less than the decision value, and
wherein the output interface is configured to output the A obtained after mapping.

2. The apparatus of claim 1, wherein the index comprises a standard deviation, a variance, a skewness, a standard deviation of skewness, a kurtosis, a standard deviation of kurtosis, a standard error of mean, an outlier, or an extremum.

3. The apparatus of claim 1, wherein the difference degree comprises a difference value between indexes.

4. The apparatus of claim 1, wherein the difference degree comprises a ratio between indexes.

5. The apparatus of claim 1, wherein the difference degree comprises an error ratio between indexes.

6. The apparatus of claim 1, wherein the processor is further configured to output, using the output interface, the attribute fields that are of the B and whose indexes and the index of the attribute field $X_i$ of the A have difference degrees less than the decision value for a user to select when a quantity of attribute fields that are of the B and whose indexes and the index of the attribute field $X_i$ of the A have difference degrees less than the decision value is greater than 2.

7. The apparatus of claim 1, wherein the processor is further configured to output, using the output interface, the attribute fields that are of the B and whose indexes and the index of the attribute field $X_i$ of the A have difference degrees less than the decision value for a user to select when a quantity of attribute fields that are of the B and whose indexes and the index of the attribute field $X_i$ of the A have difference degrees less than the decision value is equal to 2.

8. A data integration method, comprising:
sampling, by a processor, a first data source (A) at least twice to obtain a first sample data source (a) and a second sample data source (a');
separately calculating an index of each attribute field ($X_k$) of the A, an index of each attribute field ($X_k$) of the a, an index of each attribute field ($X_k$) of the a', and an index of each attribute field ($Y_j$) of a second data source (B), wherein 1≤k≤n, wherein 1≤j≤m, wherein n is a quantity of attribute fields of the A, the a, and the a', wherein m is a quantity of attribute fields of the B, and wherein each of the indexes $X_k$ and $Y_j$ is used to represent a data feature of the attribute field;

obtaining a difference degree between an index of an attribute field ($X_j$) of the a and an index of a same attribute field $X_i$ of the a', and difference degrees between the index of the attribute field $X_i$ of the a and indexes of different attribute fields of the a', wherein i is a free variable, wherein i=1, 2, 3, ..., n, and wherein the different attribute fields are all attribute fields except $X_i$ in the attribute fields of the a';

determining a decision value of an attribute field $X_i$ of the A according to the difference degree between the index of the attribute field $X_i$ of the a and the index of the same attribute field $X_i$ of the a' and the difference degrees between the index of the attribute field $X_i$ of the a and the indexes of the different attribute fields of the a' by:

setting the difference degree between the index of the attribute field $X_i$ of the a and the index of the same attribute field $X_i$ of the a' as a sample of a same attribute;

setting the difference degrees between the index of the attribute field $X_i$ of the a and the indexes of the different attribute fields of the a' as samples of different attributes; and performing classified modeling on the sample of the same attribute and the samples of different attributes using a decision tree algorithm to obtain the decision value of the attribute field $X_i$ of the A, wherein the decision value is a difference degree threshold used to determine whether an attribute field and the attribute field $X_i$ of the A represent a same attribute;

obtaining difference degrees between an index of the attribute field $X_i$ of the A and the indexes of all the attribute fields of the B; and mapping, to the attribute field $X_i$ of the A, an attribute field that is of the B and whose index and the index of the attribute field $X_i$ of the A have a difference degree less than the decision value.

9. The method of claim 8, wherein the index comprises a standard deviation, a variance, a skewness, a standard deviation of skewness, a kurtosis, a standard deviation of kurtosis, a standard error of mean, an outlier, or an extremum.

10. The method of claim 8, wherein the difference degree comprises a difference value between indexes.

11. The method of claim 8, wherein the difference degree comprises a ratio between indexes.

12. The method of claim 8, wherein the difference degree comprises an error ratio between indexes.

13. The method of claim 8, wherein the attribute fields that are of the B and whose indexes and the index of the attribute field $X_i$ of the A have difference degrees less than the decision value are output for a user to select when a quantity of attribute fields that are of the B and whose indexes and the index of the attribute field $X_i$ of the A comprises difference degrees less than the decision value is greater than 2.

14. The method of claim 8, wherein the attribute fields that are of the B and whose indexes and the index of the attribute field $X_i$ of the A have difference degrees less than the decision value are output for a user to select when a quantity of attribute fields that are of the B and whose indexes and the index of the attribute field $X_i$ of the A comprises difference degrees less than the decision value is equal to 2.

15. A computer program product comprising computer-executable instructions stored on a non-transitory computer-readable medium that, when executed by a processor, cause a data integration apparatus to:

sample a first data source (A) at least twice to obtain a first sample data source (a) and a second sample data source (a');

separately calculate an index of each attribute field ($X_k$) of the A, an index of each attribute fields ($X_k$) of the a, an index of each attribute field ($X_k$) of the a', and an index of each attribute field ($Y_j$) of a second data source (B), wherein 1≤k≤n, wherein 1≤j≤m, wherein n is a quantity of attribute fields of the A, the a, and the a', wherein m is a quantity of attribute fields of the B, and wherein each of the indexes $X_k$ and $Y_j$ is used to represent a data feature of the attribute field;

obtain a difference degree between an index of an attribute field ($X_j$) of the a and an index of a same attribute field $X_i$ of the a', and difference degrees between the index of the attribute field $X_i$ of the a and indexes of different attribute fields of the a', wherein i is a free variable, wherein i=1, 2, 3, ..., n, and wherein the different attribute fields are all attribute fields except $X_i$ in the attribute fields of the a';

determine a decision value of an attribute field $X_i$ of the A according to the difference degree between the index of the attribute field $X_i$ of the a and the index of the same attribute field $X_i$ of the a' and the difference degrees between the index of the attribute field $X_i$ of the a and the indexes of the different attribute fields of the a' by:

setting the difference degree between the index of the attribute field $X_i$ of the a and the index of the same attribute field $X_i$ of the a' as a sample of a same attribute;

setting the difference degrees between the index of the attribute field $X_i$ of the a and the indexes of the different attribute fields of the a' as samples of different attributes; and performing classified modeling on the sample of the same attribute and the samples of different attributes using a decision tree algorithm to obtain the decision value of the attribute field $X_i$ of the A, wherein the decision value is a difference degree threshold used to determine whether an attribute field and the attribute field $X_i$ of the A represent a same attribute;

obtain difference degrees between an index of the attribute field $X_i$ of the A and the indexes of all the attribute fields of the B; and map, to the attribute field $X_i$ of the A, an attribute field that is of the B and whose index and the index of the attribute field $X_i$ of the A have a difference degree less than the decision value.

16. The computer program product of claim 15, wherein the index comprises a standard deviation, a variance, a skewness, a standard deviation of skewness, a kurtosis, a standard deviation of kurtosis, a standard error of mean, an outlier, or an extremum.

17. The computer program product of claim 15, wherein the difference degree comprises a difference value between indexes.

18. The computer program product of claim 15, wherein the difference degree comprises a ratio between indexes.

19. The computer program product of claim 15, wherein the difference degree comprises an error ratio between indexes.

20. The computer program product of claim 15, wherein the attribute fields that are of the B and whose indexes and the index of the attribute field $X_i$ of the A have difference degrees less than the decision value are output for a user to select when a quantity of attribute fields that are of the B and whose indexes and the index of the attribute field $X_i$ of the A comprises difference degrees less than the decision value is greater than 2.

\* \* \* \* \*